United States Patent

[11] 3,589,689

| [72] | Inventor | John C. English |
|---|---|---|
| | | Longview, Tex. |
| [21] | Appl. No. | 777,969 |
| [22] | Filed | Oct. 28, 1968 |
| [45] | Patented | June 29, 1971 |
| [73] | Assignee | Eastman Kodak Company |
| | | Rochester, N.Y. |
| | | Continuation-in-part of application Ser. No. 498,790, Oct. 20, 1965, now abandoned. |

[54] VAPOR-LIQUID CONTACT PROCESS
1 Claim, 8 Drawing Figs.

[52] U.S. Cl. .................................................. 261/114,
202/158, 55/248
[51] Int. Cl. ..................................................... B01d 3/18,
B01d 3/28, B01f 3/04
[50] Field of Search ............................................ 261/113,
114, 114 JP, 108, 114.1, 114 VT; 23/270.5;
202/153, 158; 203/17, 49; 55/248

[56] References Cited
UNITED STATES PATENTS

| 1,824,836 | 9/1931 | Piggot | 261/114 |
|---|---|---|---|
| 2,401,569 | 6/1946 | Koch | 261/114 |
| 2,591,343 | 4/1952 | Eld | 261/113 |
| 2,713,478 | 7/1955 | Ragatz | 261/114 |
| 2,740,697 | 4/1956 | McKay | 23/270.5 |
| 2,832,578 | 4/1958 | Gilmore | 261/114 |
| 3,362,696 | 1/1968 | Vaughan | 261/114 |
| 1,462,343 | 7/1923 | Jenkins | 55/248 |
| 2,457,658 | 12/1948 | Graham | 261/114 X |
| 2,476,095 | 7/1949 | Houghland | 261/114 |
| 3,251,176 | 5/1966 | Gleason | 55/355 |
| 764,049 | 7/1904 | Guldlin | 261/119 JP |

FOREIGN PATENTS

| 717,851 | 2/1942 | Germany | 261/114.1 |
|---|---|---|---|

OTHER REFERENCES 1,100,597; March 1961; German Printed Application; Joseph Anthony McWilliams.

*Primary Examiner*—Ronald R. Weaver
*Attorneys*—William T. French and John A. Gazewood ABSTRACT: A tray for use in vapor-liquid contacting columns in which the vapor flows upwardly through orifices in the tray and liquid flows downwardly through the column. The tray comprises a corrugated surface having spaced ridges running the length of the tray. The corrugated surfaces having a multiplicity of orifices therethrough for vapor flow upwardly through the tray and the orifices are arranged in spaced groups separated from the next adjoining group of orifices by a portion of the tray which does not contain any orifices. A liquid downcomer receives liquid on one section of the tray and another liquid downcomer discharges liquid from another section of the tray, whereby liquid is caused to flow horizontally on the tray surface. Baffles are joined with the corrugated surface and have passageways therethrough. The baffles are positioned on and extend for the entire length of the ridges. The passageways in the baffles have louvers formed thereover and the passageways are arranged in alternating sections along the length of the baffles so that the louvers of one of the alternating sections protrude from one side of the baffle and the louvers of an adjacent section protrude from the opposite side of the baffle. Each section of the passageways are coextensive with a group of orifices in the tray are positioned so that the orifices in the tray are on the side of the baffle corresponding to the outlet-side of the louvered opening in that section. The baffle has thereon a continuous path for liquid flow along the baffle surface to the corrugated tray. A perforated cover joins the baffles. The cover extends from each baffle and joins adjacent baffles to form a multiplicity of parallel, tunnel-shaped enclosures. The cover has thereon a continuous path joining with the continuous path of the baffle for the liquid flow along the surfaces of the cover and baffle to the corrugated surface.

PATENTED JUN29 1971 3,589,689

INVENTOR
JOHN C. ENGLISH

BY R. Frank Smith
William T. French
ATTORNEYS

INVENTOR
JOHN C. ENGLISH

BY C. Frank Smith
William T. French

ATTORNEYS

VAPOR-LIQUID CONTACT PROCESS

This application is a continuation-in-part of copending application Ser. No. 498,790, filed Oct. 20, 1965 and now abandoned. This invention relates to a process and an apparatus for contacting vapors and liquids in a column. More particularly, the invention relates to a tray adapted for use in vapor-liquid contacting columns and the process by which the tray functions.

In the separation of mixtures comprised of components of different volatility, such as in distillation or absorption processes, it is normal to employ a column in which vapors moving upwardly are countercurrently contacted with liquids moving downwardly at conditions of temperature and pressure which will effect a mass transfer between the two phases. In certain of these columns, the vapor and liquid are contacted on a series of horizontal trays or plates, with the liquid flowing horizontally across the tray as a shallow pool and the vapors rising vertically through orifices in the tray and bubbling through the liquid.

The trays used in such applications are commonly known as bubble cap and sieve trays. One of the most widely used is a simple sieve tray in which vapor passes upwardly through a multiplicity of perforations through the tray at such a velocity that the liquid does not drain through those same perforations to the tray below. Such a tray is relatively easy to manufacture and provides an effective means of contacting vapors and liquids. Such trays have been used to replace bubble cap plates in towers where additional capacity above that obtainable with bubble cap plates is desired. Both types of tray are subject to the same objectionable characteristics in that high vapor velocities through the column cause the liquid to be blown off the tray with entrainment of the liquid in the tray above.

During the countercurrent contact of the vapor and liquid streams, heat is transferred from the vapor to the liquid by sensible heat transfer, resulting in vapor condensation and/or liquid vaporization. This transfer of heat and mass takes place at the liquid-vapor interface. The rate of such transfer is influenced by the interfacial area and the liquid and vapor velocities at the interface. For instance, a drop of liquid falling through a stream of vapor has a lower rate of transfer than vapor bubbling through liquid. As a general rule, it may be said that the tray efficiency is generally at its greatest value at high vapor velocities which are sufficient to shear the liquid into a sheet around the edge of the orifice but not high enough to blow the liquid off the tray. In other words, better mixing and therefore higher efficiencies result from greater vapor velocities until the point is reached where further increases in vapor velocity cause severe entrainment, channeling of vapor, or flooding. It is desirable, then, to develop a means for efficient phase separation, particularly at very high vapor rates at which better mixing and consequently higher efficiencies are obtained and/or under conditions of substantial liquid entrainment.

The present invention provides an improved tray adapted for use in vapor-liquid contacting columns as well as an improved process for effecting vapor-liquid contact. The improved trays are capable of operating at a high efficiency over a wider range of liquid and vapor velocities and under conditions of substantial liquid entrainment. The capacity of columns utilizing the improved trays disclosed herein are increased, for example, in comparison to conventional bubble cap and sieve trays.

As an aid to understanding the invention, it can be indicated that it involves both apparatus for use in phase separation processes and a novel and improved phase separation process. The apparatus generally comprises a tray adapted for use in vapor-liquid contacting columns, said columns having means to cause vapor flow upwardly through trays positioned in the column, flow of liquid or less-volatile component downwardly through the column and horizontally across each tray. The tray generally comprises a planar sheet having a multiplicity of orifices for vapor flow and means for receiving and discharging a less-volatile component and to cause the heavier component to flow horizontally across the planar surface; an entrainment removal means; and a connecting surface between the entrainment removal means and the tray surface. The connecting surface is provided with a continuous path for conducting separated liquid from the entrainment removal surface to the planar or tray surface, preferably in an essentially unbroken film, where the liquid can again be contacted at the orifices of the planar surface by the high velocity vapors passing up through the tray. Thus it can be seen that the trays provide at least a film of liquid on the tray surface at all times for continuous contact of the liquid at the periphery of the orifices on the surface at which point vapor velocities are greatest, thereby maintaining the tray efficiency at high values, even under conditions of substantial liquid entrainment.

It is a feature of the invention that the connecting surface between the entrainment removal means and the tray surface can be a perforated baffle. It has been found to be advantageous when the perforations of the baffle are separated from the tray surface by a blank area of up to about two inches in length and extending across the entire width of the baffle, i.e., the baffle surface which is joined to the tray surface. While preferred, it is not necessary that the connecting surface be continuous across the tray. Preferably, the distance from the tray surface to the nearest perforations of the baffle is on the order of 3 to 6 hole diameters. While it is preferred that the connecting surface be parallel to the liquid flow, properly designed and located, a properly designed connecting surface located across the liquid flow, for instance, perpendicular to the liquid flow, has improved performance characteristics in comparison to, for instance, standard sieve trays. In a preferred embodiment, discussed in greater detail hereinafter, the baffles are provided with louvered openings.

It is another feature of the invention that the design of the entrainment removal means and the connecting surface is not critical. In certain embodiments, the entrainment removal means may be the connecting surface, for instance, the baffle itself. The two surfaces may have the same design (louvered sheet metal) or different, for instance, the connecting surface can be a louvered metal baffle and the entrainment removal means can be steel wool or a glass wool eliminator mat. It is critical, however, that the surfaces must present a continuous surface whereby the liquid can be conducted, preferably in a unbroken film, from the point of contact of the entrained liquid and vapor with the entrainment removal means back to the surface of the tray adjacent to the orifices, to be further contacted by vapors passing through said orifices. Thus it can be seen that the entrainment removal means and the connecting surface can be of the same or different design and construction and can constitute any surface suitable as a vapor-liquid impingement surface such as louvered sheet metal, screen, perforated sheet, steel wool, glass wool eliminator mat, slotted and bulged metal, sheet metal with stabbed holes, etc. subject to the provision of a continuous surface for returning the liquid from the point of contact of the entrained liquid and vapor on the entrainment removal surface to the tray surface.

The surfaces can be sloping, curved, straight or any configuration which permits the liquid to be returned in a continuous path to the tray surface.

The planar surface of the tray can be flat, undulating, sharply ridged or, in essence, be of any design known to the person skilled in the art. It is an important feature of the invention that existing trays can be easily modified to incorporate thereon an entrainment removal means and connecting surface having a continuous path for conducting the liquid from the point of contact of the entrained liquid and vapor on the entrainment removal surface back to the tray surface. The planar surface can be provided with perforations, formed orifices to direct the liquid and vapor against the entrainment removal means, louvered orifices, stabbed holes, orifices with valves, bubble caps or any other type of orifice suitable for providing vapor flow through a tray surface. In a preferred embodiment, described in more detail hereinafter, the planar surface is corrugated and provided with perforations.

Another feature of this invention is an improved phase separation process. Again, the process is generally adapted for use in the vapor-liquid contacting columns described in general terms heretofore. The process comprises passing vapor through the liquid on the tray at a velocity causing substantial entrainment of said liquid; separating the entrained liquid from its entraining vapor by impingement on an entrainment removal means and returning the separated liquid along a continuous surface from the entrainment removal means to the tray surface to be further contacted by vapors passing upwardly through the tray and liquid. Thus, enrichment of vapor and liquid takes place predominantly at the tray surface where the maximum surface area of the liquid is exposed to the high velocity vapors issuing through the tray orifices. By continually providing a film of liquid at the periphery of the orifices in the tray surface, phase separation is enhanced and contact efficiencies are maintained at high levels, especially at higher vapor velocities.

As pointed out, in the practice of my invention it is critical that a continuous surface or path be provided whereby the liquid, after being separated from its entraining vapor, can be returned to the tray surface to be again contacted by vapors flowing upwardly through the tray. This requirement is furnished by a tray comprising (1) a planar surface having a multiplicity of orifices for vapor flow upwardly through said tray, means for receiving liquid on one section of said tray, means for discharging liquid from another section of said tray, whereby said liquid is caused to flow horizontally across the tray surface; (2) an entrainment removal surface; and (3) a connecting surface from said entrainment removal surface to said planar surface, said connecting surface having thereon a continuous path for flow of liquid from entrainment removal surface to planar surface, whereby in normal operation liquid flowing across the tray is entrained by vapors flowing upwardly through the tray and vapor and entrained liquid are caused to impinge against the entrainment removal means thereby separating the liquid and vapor and the liquid is returned via the continuous path along the connecting surface to the tray surface, preferably to the periphery of the orifices therein, to be again contacted by the vapors flowing upwardly through the tray.

In another configuration, the tray comprises a planar surface having a multiplicity of orifices for vapor flow upwardly through said tray, means for receiving liquid on one portion of said tray, means for discharging liquid from another portion of said tray, whereby said liquid is caused to flow horizontally across the tray surface, a multiplicity of baffles in contact with and extending from said planar surface, said baffles having a multiplicity of vapor passageways therethrough, said baffles having on the surface thereof a continuous path merging with said planar surface, and an entrainment removal surface in contact with said baffle and having a continuous surface thereon joining with the continuous surface of said baffle; whereby in normal operation liquid flowing across said tray is entrained by vapors flowing upwardly through said tray and said vapor and entrained liquid is caused to impinge against said entrainment removal surface thereby separating liquid and vapor whereby liquid is returned on said continuous surface to the planar surface to be contacted again by vapors flowing upwardly therethrough. It is preferred that there be on the order of up to about 2 inches, preferably in the range of 3 to 6 hole diameters, of blank space between the tray surface and the nearest passageways of the connecting surface or baffle. It has been found that this blank area is beneficial in returning the liquid in an essentially unbroken film from the entrainment removal means to the tray surface and minimizes blowing the liquid from the surface by the high velocity vapor prior to the contacting of the liquid with the vapor at the periphery of the tray orifices.

In one of its preferred configurations, the tray comprises (1) a corrugated surface having spaced ridges running the length of the tray, preferably in the direction of liquid flow, means for receiving liquid on one side of said tray, means for discharging liquid from the other side of said tray whereby liquid is caused to flow horizontally across the surface of said tray, the corrugated surfaces having a multiplicity of substantially evenly distributed orifices therethrough for vapor flow upwardly through said tray; (2) baffles joined with said corrugated surface, said baffles having vapor passageways therethrough, said baffles being positioned on and extending for the entire length of said ridges, said vapor passageways being substantially evenly distributed over the surface of each baffle, said baffles having thereon a continuous path for liquid flow along the baffle surface to the corrugated surface; and (3) a perforated cover joined with said baffle; said covers extending from each baffle and joining adjacent baffles to form a multiplicity of parallel, tunnel-shaped enclosures, said covers having thereon a continuous path joining with the continuous path of the baffle for liquid flow along the surfaces of the cover and baffle to the corrugated surface. Tunnel-shaped enclosures having a hexagonal cross section are advantageous. In a particularly preferred embodiment, the vapor passageways in the connecting surfaces and entrainment removal means comprise louvered openings arranged in alternating sections along the length of the baffle such that the louvers in one section cause the vapor to flow in one direction through the baffle while the louvers in adjacent sections cause the vapor to flow in the opposite direction. Furthermore, these sectioned, louvered baffles are coordinated with spaced groups of orifices in the corrugated tray surface such that a group of orifices is positioned on the outlet side of a baffle section.

The invention includes an improvement in a process in which vapors pass upwardly through orifices in a tray over which liquid flows in a horizontal direction. The improvement of this invention is to pass the vapor through the liquid at a velocity sufficiently high to cause substantial entrainment of the liquid in the vapor, to impinge the stream of vapor and its entrained liquid on an entrainment removal surface causing substantially all of the entrained liquid to be separated from the vapor and to deposit on the entrainment removal surface and to flow downwardly on that surface to the orifices to be contacted again by vapor. In the preferred process the entrainment removal surface causes the vapor to change direction sharply as the vapor passes through the surface, and the entire operation functions at a Murphree tray efficiency of at least 60 percent when stripping acetone from a solution of acetone in water using air at atmospheric conditions with the stripping vapor at a velocity of 15 to 20 ft./sec. measured immediately above the tray.

The invention may be more fully understood by reference to the attached drawings in which.

Figure 1:
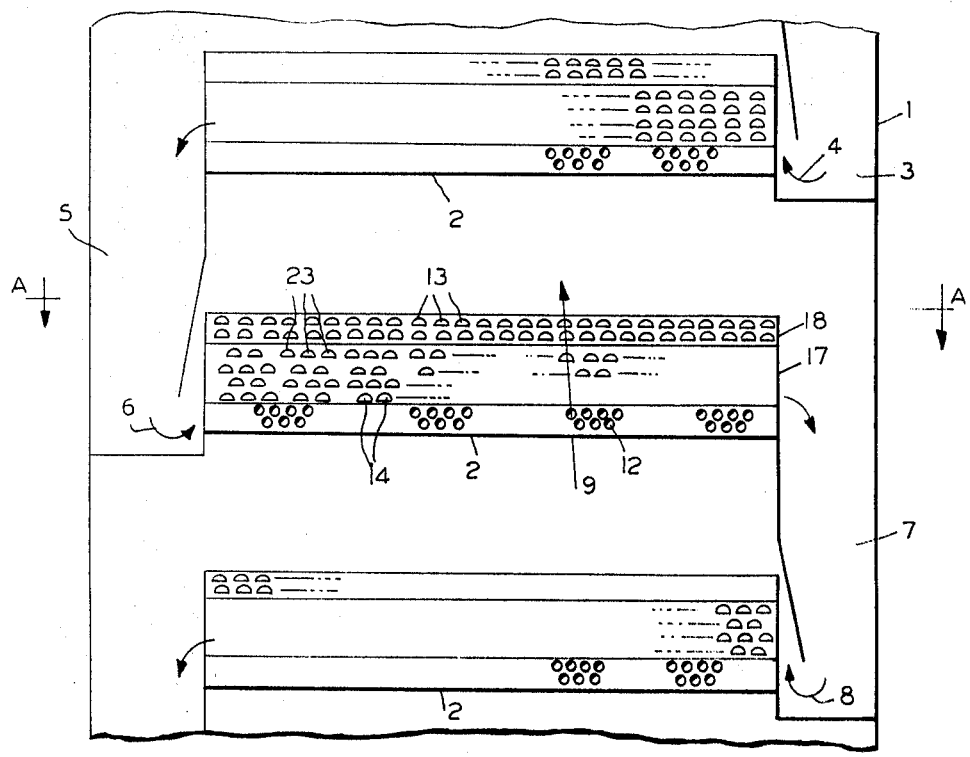
FIG. 1 is a schematic view of a vapor-liquid contacting column containing an embodiment of the trays of this invention.
Figure 2:
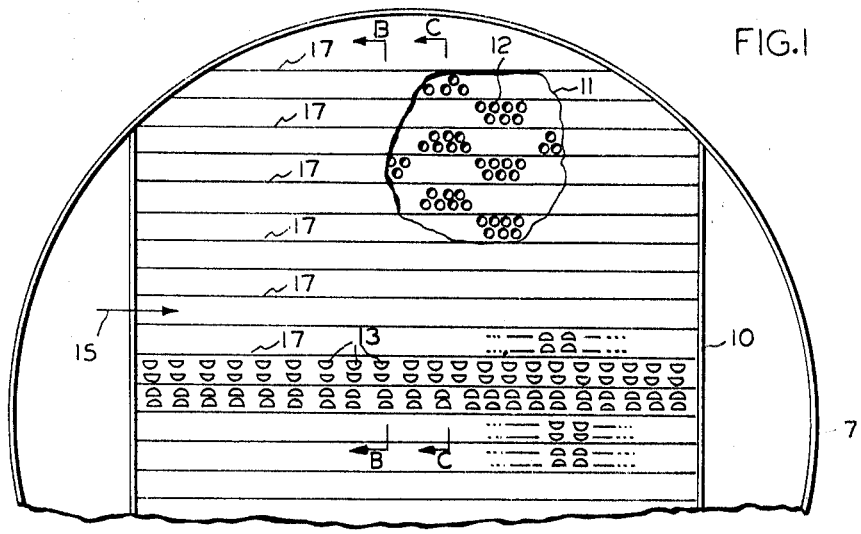
FIG. 2 is a partial, cross-sectional view taken along line A-A of FIG. 1.

With specific reference to FIGS. 1 and 2, a vapor-liquid contacting column indicated generally at 1 is made up of a series of horizontal sieve trays 2, which are identical with one another and which provide means for the liquid in the contacting column to flow horizontally across the column and to be contacted by vapor. The liquid reverses its direction of flow as it approaches each succeeding sieve tray, e.g. in downcomer 3, the liquid flows in the direction indicated by arrow 4, across the uppermost sieve tray from right to left, overflowing into downcomer 5, and thence in the direction shown by arrow 6 onto the next succeeding sieve tray, flowing across it in a direction from left to right to be collected in downcomer 7 and then by flowing in the direction of arrow 8, flowing in a direction from right to left across the third sieve tray, and so on throughout the remainder of the column. The vapor flow moves upwardly in the column through each succeeding sieve tray in the direction shown by arrow 9. In passing through any one sieve tray, the vapor must pass upwardly through orifices 12 in the corrugated surface of tray 2 and thence through a shallow layer of liquid on that sieve tray. When the vapor passes through the liquid by forming bubbles which rise through the liquid or by forcibly blowing through the liquid, a mass transfer is effected between the liquid and vapor. After passing through the liquid on tray 2, the vapor passes outwardly through passageways or openings 14 in baffles 17 or through perforations or openings 13 in convex covers 18.

The sieve tray, in combination with baffles 17 and covers 18, is therefore a series of tunnels placed side by side in parallel relationship, providing passageways for the liquid to flow, as shown in FIG. 2, from downcomer 5 in the direction of arrow 15 across the tray from left to right, and thence over weir 10 into downcomer 7. Each individual section of tunnel as shown in these drawings is substantially hexagonal in cross-sectional shape, in that it has a V-shaped floor, two vertical walls rising from each end of the V, and an inverted V-shaped cover connecting the tops of each of the two walls in a gabled, rooflike structure. The sides of the hexagonal tunnel above the liquid level are perforated to permit vapor to pass freely through in a direction which is substantially perpendicular to the long axis of the tunnel. It is entirely appropriate to employ shapes other than hexagonal, e.g. oval, heptagonal, octagonal, etc. Furthermore, it is not necessary to employ covers 18 if the baffles are high enough to catch all the vapor with its entrained liquid.

In the broken away section shown at 11 in FIG. 2, the floor of the tunnel may be seen. It is arranged with groups of orifices spaced-apart by non perforated portions, thereby forming a checkerboard design. This design of the floor of the sieve tray is made to correspond with an alternating design of openings 14 and 23 in vertical baffles 17. Openings 14 and openings 23 in FIG. 1 direct the flow of vapor through the baffle in opposite directions. Openings 23 are registered with orifices 12 in order the entrained liquid caught by openings 23 will flow vertically down the baffle and over orifices 12. In a similar fashion, openings 14, which conduct the vapor through the baffle in a direction opposite to that through openings 23, will be registered with orifices similar to 12, but on the opposite side of the corrugated floor of the sieve tray, so that entrained liquid caught by openings 14 will flow down the opposite side of baffle 17, and over a grouping of orifices 12, not shown here. Although alternate and succeeding sections of baffles 17 direct the vapor flow to one side or to the other side of that baffle, all openings in cover 18 conduct the vapor in one direction only, namely, from the inside to the outside of the tunnel. The checkerboard design maintains a balanced flow of vapor so that the next tray above will receive a uniform flow of vapor.

Figure 4:
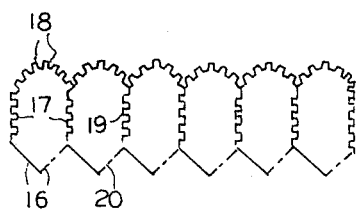
FIG. 4 is a cross-sectional view taken along line C-C of FIG. 2.
Figure 3:
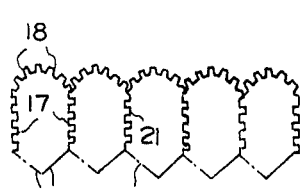
FIG. 3 is a cross-sectional view taken along line B-B of Fig. 2.

In FIGS. 3 and 4, the general construction of the sieve tray may be more easily understood. FIG. 3 is a cross section taken along line C–C, these being two adjacent sections at right angles in the liquid flow. The floor of the sieve tray is a corrugated design made up of a series of V-shaped sections 16. A vertical baffle 17 is placed on each ridge of the corrugated floor section and the top edges of adjacent baffles are joined by inverted V-shaped cover sections 18. The structure forms a series of parallel tunnels extending from one side of the vapor-liquid contacting column to the other side, conducting liquid in the trough formed by the corrugation 16 in the floor section of the tray, and providing openings in baffles 17 and covers 18, to permit vapor to rise through the walls of the tunnel.

It may be seen that cross sections represented by FIGS. 3 and 4 are mirror images of each other. In FIG. 3, the orifices through the floor of the tray are at 22 in the left-hand surface of the V-shaped floor. In FIG. 4, the orifices through the floor of the tray are at 20, in the right-hand surface of the V-shaped floor. In FIG. 3, baffles 17 have openings 21 directing the flow of vapor from the left to the right, thus placing the exit of the openings vertically above orifices 22. In FIG. 4, baffles 17 have openings 19 which direct the flow of vapor from the right to the left, thus placing the exit of the openings vertically above orifices 20. The openings in cover 18 are all the same in the sense that they direct the flow of vapor from the inside to the outside of the hexagonal interior. The direction of the openings in baffles 17 and the direction and location of the orifices in floor 16 are alternated along the length of the tunnel as shown by comparing FIGS. 3 and 4 with the broken section at 11 in FIG. 2.

The purpose of having louvered openings is to change the vapor flow direction suddenly in order to deposit the entrained droplets of liquid on the solid surfaces of baffles 17 or covers 18, and thereby free the vapor to continue to the next tray and to return substantially all of the liquid down the downstream side of the baffle to the tray floor. In passing through a louvered opening, the entrained liquid clings to the wall of baffles 17 or covers 18, runs down the walls by gravity and returns to orifices in the floor, to be contacted by more vapor. The alternating pattern of openings in the vertical baffles and of the orifices in the tray floor produces a substantially even distribution of the liquid back to the floor of the sieve tray and to the vapor orifices for contact with fresh vapor. It is preferable therefore that the directions of the openings in baffles 17 change every few inches along the length of the baffle measured in the direction of liquid flow.

It is not necessary that baffles 17 be solid walls with louvered openings, since any surface against which the vapor and its entrained liquid can be impinged with sufficient force to remove the entrained liquid will suffice for this purpose. A wire screen or a perforated wall would be adequate in certain embodiments of this invention.

Figure 5:
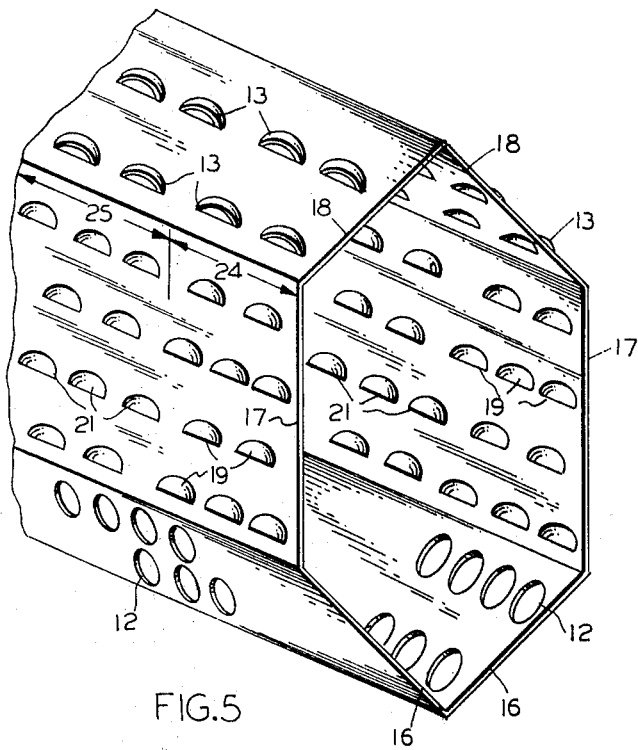
FIG. 5 is an isometric view of one section of the tray.
Figure 6:
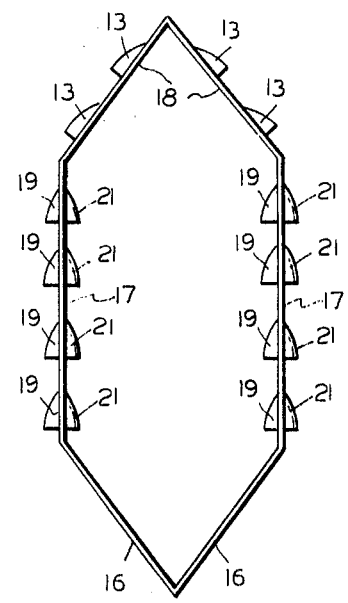
FIG. 6 is an end view of the section shown in FIG. 5.

One section of a hexagonal tunnel as described above is shown in an enlarged isometric view of FIG. 5 and in an end elevational view of FIG. 6, with two surfaces of the floor section 17, two vertical baffles 17, and two portions of the cover 18 going to make up the hexagonal section. The liquid level on the floor section can be regulated by the height of weir 10 and can be made sufficient to cover orifices 12 and thereby providing adequate opportunity when the vapor is rising at low velocity through these orifices to contact liquid being carried in the trough between the two surfaces 16. At high vapor rate there is very little liquid in the trough for the liquid is blown out by the vapor and substantially all of the liquid is on the baffles and flowing down the side of the ridges of the tray to the vicinity of the vapor orifices.

Each tunnel is made of a connected series of sections 24 and 25. In section 24, the openings 19 in the two baffles 17 direct the flow of vapor from right to left through each baffle. In section 25, openings 21 in baffles 17 are opposite to openings 19 and direct the flow from left to right through the baffle 17. The next succeeding section beyond section 25 is exactly the same as section 24 and the second succeeding section is the same as section 25 and so on throughout the length of the tunnel. The shape of openings 13, 19, and 21 is not critical so long as it separates the liquid from the vapor and permits the vapor to pass through the openings. In the attached drawings, the openings are made by slitting the baffle and pushing the metal above the slit out of the plane of the baffle to produce a semielliptical opening. Other shapes are equally operable, e.g. semicircular, rectangular, etc., or the baffles may be made of screen, wire mesh, shredded material or any substance used in mist eliminators. The amount of open area and its location should be arranged to suit the operating conditions of the tray according to the best design principles of mist eliminators so as to permit the liquid to be deposited and the vapor to pass through without blowing the liquid off the baffle.

All openings 13 in cover sections 18 are the same in that they direct the flow of vapor from inside the tunnel to the outside.

Figure 7:
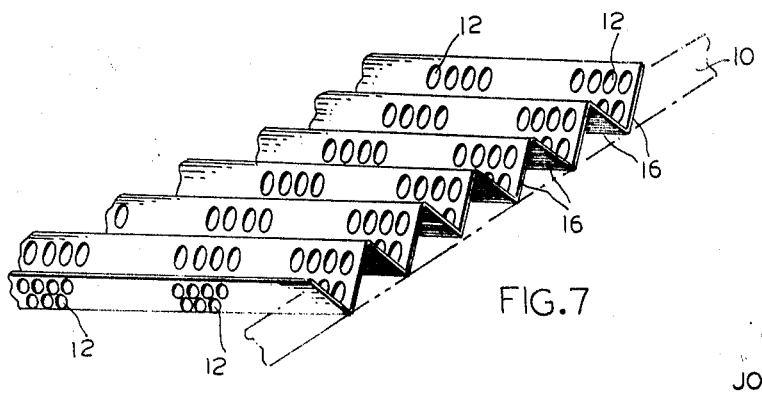
FIG. 7 is a partial isometric view of the tray with the baffles and cover sections removed.

If baffles 17 and covers 18 are removed from the floor section, the view shown in FIG. 7 is the result. The floor section is made up of surfaces 16 which form a corrugated, V-shaped structure. The floors are perforated by orifices 12 distributed uniformly over the floor area, preferably arranged in spaced groups such that the overall effect is a checkerboard design. In the operation of the sieve tray as shown in FIGS. 5, 6 and 7, liquid flows along the trough formed by adjacent surfaces 16 to a level fixed and maintained by an adjustable weir 10.

Vapor rising from beneath the tray passes through orifices 12 with a force and at a velocity such that liquid does not flow downwardly through these holes. At high velocities, the vapor entrains a considerable amount of liquid, and except for the presence of baffles or the use of an extremely large spacing between trays, the entrained liquid might cover the underneath portions of orifices 12 on the next higher tray, thereby restricting the flow of vapor, causing the pressure drop across the tray to build up, causing the column to flood by not permitting the liquid to flow down the downcomer. It is therefore important to separate as much entrained liquid as possible from the vapor before it contacts liquid on the next higher tray and to return the entrained liquid to the tray it left. This keeps liquid of essentially the same chemical composition on the same tray.

Some vapor passes from one tunnel section to another through baffles 17, but because of the pressure of oncoming vapors, the vapor eventually rises through openings 13 in cover sections 18 and approaches the next tray above to contact the liquid on that tray.

The shape and size of orifices 12 is likewise not critical and may be round, oval, rectangular, etc., or may be provided with valves to prevent dumping at low vapor flow, although the total open area should represent from about 4 percent to about 30 percent of the total area of the floor section of the tray for optimum performance. It is important, however, that the orifices 12 are positioned immediately below the openings in baffles 17 in the path of the liquid flowing from those openings.

Another representative embodiment of the invention includes a tray equipped with a baffle extending upwardly from the tray surface and having the baffle positioned across the liquid on the tray. The baffle is perforated with an unperforated section between the perforations and the tray. The baffle can optionally extend to the next higher tray. The baffle can be straight or, preferably, curved. In this embodiment the baffle serves as entrainment removal means and connecting surface.

The capacity and efficiency of existing columns can be increased without changing out the existing trays by modifying the trays in accordance with this invention. For instance, a curved perforated baffle having an unperforated section at the bottom adjacent to the tray can be attached to a sieve tray. Optionally, the section nearest the tray can be formed so as to alter the angle at which the liquid returns to the tray. For a bubble cap tray the baffles can be attached to the top of the bubble caps to return the liquid to the openings in the bubble caps.

Figure 8:
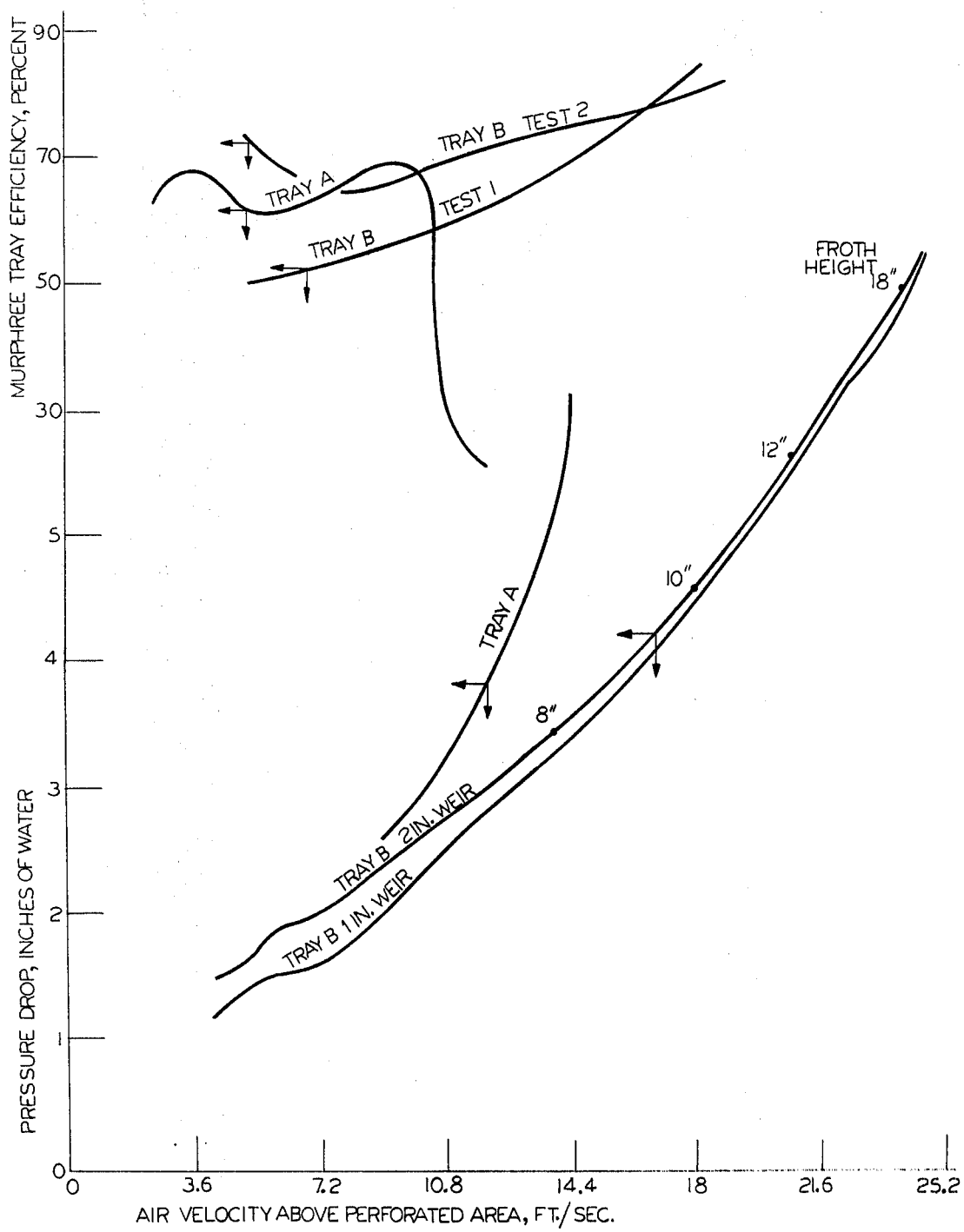
FIG. 8 is a graph showing the operating characteristics of a tray of this invention in comparison with one of the prior art.

In a series of experiments, the tray of this invention was compared with the usual type of sieve tray employed in industry today, i.e. a flat plate perforated with 3/16-inch holes on a triangular pitch of one-half inch, thereby providing an open area of about 11.5 percent of the total tray area. One series of tests was performed in a rectangular column in which the trays measured 3 inches × 26 inches, and another series of tests was performed in a column 42 inches in diameter in which the flow path across the tray was 27 inches long. In these tests the liquid was a mixture of about 600 p.p.m. of acetone in tap water at 50° F. and the vapor was air at 50° F. which was blown through the liquid in order to desorb the acetone from the water. Various vapor velocities were employed and efficiencies and pressure drops were measured and plotted with the results on the graph shown on FIG. 8. Equivalent Vapor Velocity is the product: (velocity of the vapor immediately above the tray, ft./sec.) × (density of vapor)$^{1/2}$. Type A is the typical unbaffled flat sieve tray with 3/16-inch holes, and Type B is a baffled sieve tray of this invention in which each baffle was made up of 3-inch sections having 30 openings measuring approximately 1/8 inch × 1/2 inch, adjacent sections having opposite vapor flow directions as described above. The cover sections were made up with 2—3 openings (each measuring approximately 3/16 inch × 9/16 inch) per square inch of surface. The orifices in the tray floor were one-half inch in diameter with each group of orifices comprising seven orifices placed under the outlet side of the baffle. Test 1 employed the rectangular tray 3 inches × 26 inches in size and it was found to have 15.3 percent open area. Test 2 employed the same tray with 18.1 percent open area and the 42-inch diameter column at high vapor rates had 21.4 percent open area in test 3. It may be seen that the Murphree tray efficiency of Type A drops very rapidly at an air velocity of about 12.5 ft./sec., and above this value all the liquid was blown off the tray leaving none in the downcomer to seal the air flow nor to be collected for analysis. At the same time, Type B was continuing upward in its efficiency in all tests. It may also be seen that as the vapor velocities increase the pressure drop through a tray increases along the general parabolic curve for Type B, while Type A has a high rate of increase in pressure drop at an intermediate velocity. For convenience of comparing the tray of this invention with others, the froth height is shown on the curve representing the pressure drop of Type B employing a 1-inch weir.

Although the invention has been described in considerable detail with reference to certain preferred embodiments thereof, it will be understood that variations and modifications can be effected within the spirit and scope of the invention as described hereinabove.

I claim:

1. A tray adapted for use in a vapor liquid contacting column in which vapor flows upwardly through said column through orifices in said tray and liquid flows downwardly through said column; said tray comprising (1) a corrugated surface having spaced ridges running the length of the tray, the corrugated surfaces having a multiplicity of orifices therethrough for vapor flow upwardly through said tray, said orifices being arranged in spaced groups of orifices separated from the next adjoining group of orifices by a portion of the tray which does not contain any orifices; (2) means for receiving liquid on one section of said tray, means for discharging liquid from another section of said tray, whereby said liquid is caused to flow horizontally on the tray surface; (3) baffles joined with said corrugated surface and having passageways therethrough, said baffles being positioned on and extending for the entire length of said ridges, the passageways in said baffles having louvers formed thereover, said louvered passageways being arranged in alternating sections along the length of the baffles so that the louvers of one of said alternating sections protrude from one side of the baffle and the louvers of an adjacent alternating section protrude from the opposite side of the baffle, each section of the passageways being coextensive with a group of orifices in the tray and being positioned so that the orifices in the tray are on the side of the baffle corresponding to the outlet-side of the louvered opening in that section, said baffle having thereon a continuous path for liquid flow along the baffle surface to the corrugated tray; and (4) a perforated cover joining said baffles, said cover extending from each baffle and joining adjacent baffles to form a multiplicity of parallel, tunnel-shaped enclosures, said cover having thereon a continuous path joining with the continuous path of the baffle for liquid flow along the surfaces of the cover and baffle to the corrugated surface.